(12) United States Patent
Hintzer et al.

(10) Patent No.: US 10,947,378 B2
(45) Date of Patent: Mar. 16, 2021

(54) FLUOROPOLYMER COMPOSITIONS WITH HIGH CONTENT OF INORGANIC MATERIAL

(71) Applicant: 3M INNOVATIVE PROPERTIES COMPANY, St. Paul, MN (US)

(72) Inventors: Klaus Hintzer, Kastl (DE); Michael C. Dadalas, Burghausen (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 123 days.

(21) Appl. No.: 16/085,227

(22) PCT Filed: Mar. 14, 2017

(86) PCT No.: PCT/US2017/022229
§ 371 (c)(1),
(2) Date: Sep. 14, 2018

(87) PCT Pub. No.: WO2017/160786
PCT Pub. Date: Sep. 21, 2017

(65) Prior Publication Data
US 2019/0077950 A1  Mar. 14, 2019

(30) Foreign Application Priority Data
Mar. 14, 2016 (EP) ..................................... 16160197

(51) Int. Cl.
| | | |
|---|---|---|
| C08K 3/32 | (2006.01) | |
| C08L 27/16 | (2006.01) | |
| H01M 4/62 | (2006.01) | |
| H01G 11/38 | (2013.01) | |
| C09D 127/18 | (2006.01) | |
| C08K 3/04 | (2006.01) | |
| C08K 3/22 | (2006.01) | |
| C08L 23/08 | (2006.01) | |
| C08L 23/14 | (2006.01) | |
| C08L 27/18 | (2006.01) | |
| C08L 27/20 | (2006.01) | |

(52) U.S. Cl.
CPC .............. *C08L 27/16* (2013.01); *C08K 3/041* (2017.05); *C08K 3/046* (2017.05); *C08K 3/22* (2013.01); *C08K 3/32* (2013.01); *C08L 23/08* (2013.01); *C08L 23/14* (2013.01); *C08L 27/18* (2013.01); *C08L 27/20* (2013.01); *C09D 127/18* (2013.01); *H01G 11/38* (2013.01); *H01M 4/623* (2013.01); *C08K 2003/2203* (2013.01); *C08K 2003/324* (2013.01); *C08K 2003/328* (2013.01); *C08K 2201/001* (2013.01); *C08L 2203/20* (2013.01); *Y02E 60/13* (2013.01)

(58) Field of Classification Search
CPC ........ C08L 27/18; C08L 27/20; H01M 4/623; H01M 4/621; C08J 3/16; C08K 13/02
See application file for complete search history.

(56) References Cited

U.S. PATENT DOCUMENTS

| | | | | |
|---|---|---|---|---|
| 4,157,327 A | * | 6/1979 | Martin | ............... H01M 8/04074 523/307 |
| 5,846,670 A | * | 12/1998 | Watanabe | ............. H01M 4/926 429/530 |
| 6,156,453 A | | 12/2000 | Shimizu et al. | |
| 9,202,638 B2 | | 12/2015 | Amin-Sanayei et al. | |
| 2002/0168569 A1 | * | 11/2002 | Barriere | ................. H01M 4/621 429/217 |
| 2006/0099510 A1 | | 5/2006 | Naarmann et al. | |
| 2012/0015246 A1 | | 1/2012 | Amin-Sanayei et al. | |
| 2012/0107689 A1 | * | 5/2012 | Takahashi | ............ C09D 127/16 429/217 |
| 2012/0115036 A1 | | 5/2012 | Lee et al. | |
| 2013/0172477 A1 | * | 7/2013 | Hintzer | ................... C08F 16/24 524/544 |
| 2014/0110641 A1 | | 4/2014 | Murotani et al. | |
| 2015/0188140 A1 | | 7/2015 | Kose et al. | |

FOREIGN PATENT DOCUMENTS

| | | |
|---|---|---|
| CA | 2900130 A | 10/2015 |
| JP | H07-211324 | 8/1995 |
| JP | H09-199134 | 7/1997 |
| JP | H113710 | 1/1999 |
| JP | 2000-182668 | 6/2000 |
| JP | 2002-216848 | 8/2002 |
| JP | 2003-036884 | 2/2003 |
| JP | 2004-055242 | 2/2004 |
| JP | 2007-231264 | 9/2007 |
| JP | 2012-119297 | 6/2012 |
| JP | 2013-032513 | 2/2013 |
| JP | 2013-229337 | 11/2013 |
| JP | 2014-194857 | 10/2014 |
| WO | WO 01/016234 A1 | 3/2001 |
| WO | WO 2010-095601 | 8/2010 |
| WO | WO 2010-114089 | 10/2010 |
| WO | WO 2011-014715 | 2/2011 |
| WO | WO 2012-043765 | 4/2012 |

(Continued)

OTHER PUBLICATIONS

International Search report for PCT International Application No. PCT/US2017/022229 dated Jun. 7, 2017, 4 pages.

*Primary Examiner* — Gregory Listvoyb

(74) *Attorney, Agent, or Firm* — Thomas M Spielbauer

(57) ABSTRACT

A fluoropolymer composition particles comprising electro-active material, wherein the electro-active material comprises graphite and metal compounds and combinations thereof. The compositions also comprise water and an organic liquid having a boiling point between 70 C and 200 C. Also provided are methods of making a paste and methods of making electrodes and electrodes made with the paste.

14 Claims, No Drawings

(56) References Cited

FOREIGN PATENT DOCUMENTS

| WO | WO 2012-111770 | 8/2012 |
| WO | WO 2013-018664 | 2/2013 |
| WO | WO 2013-054743 | 4/2013 |
| WO | WO 2017-083076 | 5/2017 |
| WO | WO 2017-120348 | 7/2017 |
| WO | WO 2017-160786 | 9/2017 |

* cited by examiner

FLUOROPOLYMER COMPOSITIONS WITH HIGH CONTENT OF INORGANIC MATERIAL

CROSS REFERENCE TO RELATED APPLICATIONS

This application is a national stage filing under 35 U.S.C. 371 of PCT/US2017/022229, filed Mar. 14, 2017, which claims the benefit of European Application No. 16160197.6, filed Mar. 14, 2016, the disclosure of which is incorporated by reference in their entirety herein.

FIELD

The disclosure relates to aqueous fluoropolymer compositions having a high content of electro-active materials. The present disclosure further relates to articles coated with the compositions and to methods of making such articles and such compositions.

BACKGROUND

In some applications fluoropolymers are used as binders for inorganic materials. There is a need to provide fluoropolymer compositions that have a high content of substantially inorganic materials. Such compositions may be used, for example, in the production of components of energy-generating devices, such as fuel cells or batteries. Typical components include electrodes. There is a trend in the electronics industry to produce smaller devices, powered by smaller and lighter batteries. Lithium batteries, for example, batteries with a negative electrode containing a lithium compound or carbonaceous material with lithium ions, and a positive electrode containing lithium metal oxides or salts can provide higher power and lower weight. Electrodes are typically prepared by coating a porous or fabric-like carrier material with an electrode forming composition containing the electroactive material, a fluoropolymer as binder and optionally a filler. The coating is subjected to a heat treatment to form an electrode.

Fluoropolymers have been used as binder for forming electrodes because of their excellent electro-chemical resistance. Polytetrafluoroethylene (PTFE) has been used as a binder as described, for example in U.S. Pat. No. 6,156,453. However, PTFE is not soluble in water or solvents and forms smooth films only by applying high temperatures, which in turn may damage or reduce the reactivity of heat-sensitive electrode materials. Polyvinylidene fluoride (PVDF), a partially fluorinated fluoropolymer, has been used as alternative or additional binder because it can be dissolved in organic solvents. Due to its high content of partially fluorinated units, PVDF has a reduced chemical inertness and a reduced service temperature. The use of organic solvents presents a problem from an environmental point of view. Organic solvents have to be recycled, discarded as waste or incinerated. In U.S. Pat. No. 9,202,638 B2 a waterborne fluoropolymer composition for the preparation of electrodes in lithium batteries is disclosed that is reported to have good film forming properties.

SUMMARY

Applicants have found that there is a continuous need to provide water-based compositions suitable for the production of electrodes. Preferably, the compositions have sufficient viscosity to allow for the coating of porous and fabric like carrier materials used in electrode production. Desirably, such compositions allow for a high loading of electro-active materials.

In the following there is provided a fluoropolymer composition comprising
(i) fluoropolymer particles comprising repeating units derived from at least one perfluorinated comomoner selected from tetrafluoroethylene (TFE), hexafluoropropylene (HFP) and a combination thereof and one or more non-perfluorinated comonomers selected from vinylidenefluoride (VDF), ethylene (E), propylene (P) and a combination thereof; wherein the total amount of the perfluorinated comonomers is at least 40% by mole based on the total amount in moles of comonomers and wherein the fluoropolymer is melt processable;
(ii) particles comprising electro-active material, wherein the electro-active material is selected from graphite, metal compounds and combinations thereof;
(iii) optionally, carbonaceous particles other than graphite;
(iv) water; and
(v) an organic liquid having a boiling point between 70° C. and 200° C. selected from non-functional hydrocarbons and functional hydrocarbons, which functional hydrocarbons contain one or more functionality selected from nitriles, chlorines, and oxygen-containing functionalities selected from ethers, alcohols, carboxylates, carboxylate esters and combinations thereof,
wherein the amount by weight of the substantially inorganic particles (ii) is greater than the amount of fluoropolymer particles (i) and wherein the amount by weight of water is greater than the amount of organic liquid.

In another aspect there is provided a method of making a fluoropolymer composition comprising preparing an aqueous mixture comprising water and:
a) particles comprising electro-active material selected from graphite, metal compounds and combinations thereof, and, optionally, carbonaceous particles other than graphite;
b) fluoropolymer particles;
c) organic liquid;
wherein the amount by weight of the particles comprising the electro-active material is greater than the amount of fluoropolymer particles and wherein the amount by weight of water is greater than the amount of organic liquid, and wherein the fluoropolymer particles comprise repeating units derived from at least one perfluorinated comomoner selected from tetrafluoroethylene (TFE), hexafluoropropylene (HFP) and a combination thereof and one or more non-perfluorinated comonomers selected from vinylidenefluoride (VDF), ethylene (E), propylene (P) and a combination thereof; wherein the total amount of the perfluorinated comonomers is at least 40% by mole based on the total amount in moles of comonomers and wherein the fluoropolymer is melt processable, and wherein the organic liquid has a boiling point between 70° C. and 200° C. and is selected from non-functional hydrocarbons and functional hydrocarbons, which functional hydrocarbons contain one or more functionality selected from nitriles, chlorines, and oxygen-containing functionalities selected from ethers, alcohols, carboxylates, carboxylate esters and combinations thereof.

In a further aspect there is provided a method of making an electrode comprising coating a carrier material for an electrode with a paste containing the fluoropolymer composition and subjecting the paste to drying.

In yet another aspect there is provided an electrode comprising a coating obtained from the fluoropolymer composition.

DETAILED DESCRIPTION

Before any embodiments of this disclosure are explained in detail, it is to be understood that the disclosure is not limited in its application to the details of construction and the arrangement of components set forth in the following description. The disclosure is capable of other embodiments and of being practiced or of being carried out in various ways. As used herein, the term "a", "an", and "the" are used interchangeably and mean one or more; and "and/or" is used to indicate one or both stated cases may occur, for example A and/or B includes, (A and B) and (A or B). Also herein, recitation of ranges by endpoints includes all numbers subsumed within that range (e. g., 1 to 10 includes 1.4, 1.9, 2.33, 5.75, 9.98, etc.). Also herein, recitation of "at least one" includes all numbers of one and greater (e. g., at least 2, at least 4, at least 6, at least 8, at least 10, at least 25, at least 50, at least 100, etc.). Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items.

Amounts of ingredients of a composition may be indicated by "% by weight" (or "% wt". or "wt.-%" or "weight percent") unless specified otherwise. The amounts of all ingredients gives 100% wt. unless specified otherwise. If the amount of ingredients is identified by % mole the amount of the respective ingredients gives 100% mole unless specified otherwise.

Unless stated otherwise, all embodiments of the present disclosure can be combined freely.

In the following there are provided fluoropolymer compositions containing a high amount of electro-active material, for example an amount of at least 10% or at least 50% by weight based on the weight of the composition.

The compositions may be spreadable. They are suitable for the production of electrodes.

Typically, the compositions contain fluoropolymer particles and particles comprising electro-active material.

Preferably, the electro-active material particles are suitable for use as electro-active electrode material. Such particles comprise electro-active material comprising compounds involved in the electrode reaction of a chemical cell.

In one embodiment the composition is suitable for the production of electrodes for lithium batteries.

The compositions are aqueous (waterborne) by which is meant that the main liquid component (by weight) of the compositions is water.

The solid content of the compositions may be higher than the amount of liquid components.

The term "liquid" refers to the liquid state at ambient conditions (20° C., 101325 Pa).

Amounts of solids include but are not limited to from about 30 to about 70% by weight based on the weight of the composition.

Fluoropolymer Particles

The fluoropolymer particles of the present disclosure are melt-processable. This means the fluoropolymers have a melt flow index (MFI) at 297° C. and a 5 kg load (MFI 297/5) of at least 0.1 g/10 min, preferably at least 5 g/10 min (MFI 297/5). Typically the upper limit is 500 g/10 min, preferably up to 150 g/10 min, more preferably up to 100 g/10 min.

The fluoropolymer particles may act as a binder for the particles comprising the electroactive material in the production of electrodes, typically by bringing the fluoropolymer to the melt. The fluoropolymers may have a melting point of from about 90° C. to about 280° C. In one embodiment fluoropolymers are used that have a melting point of from about 100° C. to about 200° C., preferably from about 105° C. to about 161° C. Advantageously, low melting fluoropolymers can be activated as binders at rather low temperatures and also heat-sensitive electroactive-material can be used in the electrode forming compositions.

The fluoropolymers may be perfluorinated or partially fluorinated. Perfluorinated polymers contain only units derived from perfluorinated monomers. Partially fluorinated polymers contain at least one perfluorinated monomer unit and at least one partially or at least one non-fluorinated monomer unit or a combination of both. Preferably, the amount of perfluorinated monomer units in the fluoropolymers of the present disclosure is at least 40 mole %, or at least 45 mole %, or at least 50 mole %; or more than 60 mole % (the total amount of monomers adding up to 100 mole %).

Examples of perfluorinated monomers include perfluorinated $C_2$-$C_8$ olefins such as tetrafluoroethylene (TFE), hexafluoropropylene (HFP), perfluorinated vinyl ethers (collectively referred to as PAVE) and perfluorinated allyl ethers (collectively referred to as PAAE). Examples of suitable allyl and vinyl ethers include those corresponding to the general formula $$CF_2=CF-(CF_2)_n-O-Rf \qquad (I).$$

In formula (I) n represents either 0 or 1. Rf represents a linear or branched, cyclic or acyclic perfluorinated alkyl residue which optionally may contain one or more than one catenary oxygen atom. Rf may contain up to 8, preferably up to 6 carbon atoms, such as 1, 2, 3, 4, 5 and 6 carbon atoms. Typical examples of Rf include linear or branched alkyl residues optionally interrupted by one or more than one oxygen atom. In a particular embodiment Rf is selected from perfluoromethy (perfluoromethyl vinyl ether (PMVE) or perfluoromethyl allyl ether (PMAE)); and perfluoropropyl (PPVE or PPAE). Further examples of Rf include residues containing one or more of the following units and combinations thereof: —($CF_2$O)—, —($CF_2CF_2$—O)—, (—O—$CF_2$)—, —(O—$CF_2CF_2$)—, —$CF(CF_3)$—, —$CF(CF_2CF_3)$—, —O—$CF(CF_3)$—, —O—$CF(CF_2CF_3)$—, —$CF(CF_3)$—O—, —$CF(CF_2CF_3)$—O—.

Examples of suitable partially fluorinated monomers include fluorinated and chlorinated monomers, including chlorotrifluoroethylene (CTFE), 2-chloropentafluoropropylene, 2,3,3,3-tetrafluoropropylene, 1,2,3,3,3-pentafluoropropylene (1-HPFP), 1,1,3,3,3-pentafluoropropylene (2-HPFP), dichlorodifluoroethylene. Other examples of partially fluorinated monomers include vinyl fluoride (VF), vinylidene fluoride (VDF). Examples of suitable non-fluorinated monomers include ethylene (E) and propylene (P).

Suitable non-fluorinated comonomers include vinyl chloride, vinylidene chloride and $C_2$-$C_8$ olefins such as ethylene (E) and propylene (P). The amount of non-fluorinated comonomer when present is generally between 0 and 50 mole %, preferably between 1 and 40 mole %.

Specific examples of fluoropolymers include, for example, copolymers having a combination of monomers as follows (wherein the total amount in moles of perfluorinated monomers is at least 40% by mole, or at least 45% by mole):

TFE-P, TFE-HFP-VDF (THV), TFE-VDF-PAVE, TFE-HFP, E-TFE-HFP (HTE), TFE-PAVE, TFE-E-PAVE, TFE-E (ETFE) and any of the aforementioned copolymers further including units derived from a chlorine containing monomer such as CTFE. In some embodiments the amount of perfluorinated monomers is at least 45 mole %, or at least 65 mole % and the amount of not perfluorinated monomers is at least 8 mole %.

In one particular embodiment the fluoropolymers have the following composition: TFE: 50-88 wt. %; HFP 0-36 wt. %; ethylene 8-26 wt. %; PAVE and/or PAAE 0-12 wt. %; (total composition adding up to 100 wt. %).

In one embodiment the fluoropolymers are THV polymers with a melting point in the range from 90-280° C., or from 100 to 200° C., preferably from 105 to 161° C.

The fluoropolymers are added as particles. They can be provided as a dry powder (free-flowing particles) or may be dispersed or suspended in another medium. Preferably, the fluoropolymers are added as an aqueous dispersion.

Aqueous dispersions of fluoropolymers are typically prepared by aqueous emulsion polymerization as known in the art. They yield small fluoropolymer particles, typically in the size of from about 50 to 500 nm.

Polymer particles obtained by grinding polymer pellets typically yield greater particles sizes.

The emulsion polymerization typically involves the use of fluorinated emulsifiers but for regulatory reasons the use of fluorinated emulsifiers is not desired. Preferably, fluoropolymers are used that were prepared by aqueous emulsion polymerization without using fluorinated emulsifiers. Such polymers may be prepared by using non-fluorinated emulsifiers instead. The resulting dispersions are free of added fluorinated emulsifiers and only contain low amounts of emulsifiers. They contain lower amounts of emulsifiers than dispersions that were prepared with fluorinated emulsifiers and then subsequently treated to remove the fluorinated emulsifiers, for example by phase separation or anion-exchange as known in the art. Such treatments involve the addition of rather high amounts of stabilizing non-fluorinated emulsifiers.

The polymerization of fluoropolymers without non-fluorinated emulsifiers is described, for example in WO2007/120348 and WO2011/014715, incorporated herein by reference.

Amounts of fluoropolymers in the aqueous compositions according to the present disclosure include but are not limited to 0.5 to 10% by weight based on the weight of the composition.

Particles Comprising Electro-Active Material

The present composition contains particles comprising electro-active material. The particles are suitable for the production of electrodes. The material comprises or consists of electro-active material, i.e. material that can participate in the electrode reaction of a chemical cell. The particles may be added as solids, or dispersed or suspended in another material. Typically, the particles are provided as dry solids, for example in the form of a free flowing powder.

The electro-active particles may have a size of less than 15,000 μm, or less than 5,000 μm. Generally, the average particle sizes (number average) are from 500 nm to about 2,000 μm. The particles may be substantially spherical which includes spherical particles and elongated particles that can be approximated as spheres having a longest axis that is up to 2 times the length of the second longest axis. The particles may be in the form of fibers, for example fibers where the longest axis has more than 5 times or more than 10 times the length of its diameter, or the particles may have other shapes. Typically, the particles are dispersed or suspended in water, which typically already contains the organic liquid and, optionally, a wetting agent.

The electro-active material may comprise graphite, metal compounds and combinations thereof.

In one embodiment the particles consist of the electro-active material, which preferably consists of particles selected from graphite and/or the metal compounds.

In another embodiment, the particles comprise the electro-active material and one or more carrier materials. For example, graphite and/or the metal compounds may be coated on or mixed with a carrier material.

The particles may contain a significant amount of graphite or metal compounds, for example at least 30% by weight of the particles, or at least 50% by weight of the particles, or at least 95% by weight of the particles.

The metal compounds include metal salts, metal oxides and combinations thereof. Particular examples of metal compounds include oxides and metal salts of lithium and/or a transition metal (including but not limited to cobalt, manganese, aluminum, titanium, or nickel, and iron phosphates, manganese phosphate). Double, and triple salts of lithium are also contemplated. Examples of salts include but are not limited to sulfides, hydroxides, phosphates and combinations thereof. Particular examples include lithium-metal oxides such as lithium-cobalt oxide, lithium manganese phosphate, lithium-nickel oxide, and lithium-manganese oxide.

Preferred electrode materials include, but are not limited to, $LiCoO_2$, $LiNi_xCo_{1-x}O_2$, $LiMn_2O_2$, $LiNiO_2$, $LiFePO_4$, $LiNi_xCo_yMn_zO_m$, $LiNi_x$—$Mn_yAl_zO_m$ where x+y+z=1 and m is an integer representing the number of oxygen atom in the oxide to provide an electron-balanced molecule.

The weight ratio of fluoropolymer to the electro-active particles may depend on the type of particles, type of polymer, and electrode design. Typically the amount of the particles comprising the electro-active material is greater than the amount of fluoropolymer particles. Generally, the weight ratio of fluoropolymer to the particles comprising the electro-active material may be from about 1:2 to about 1:100. Amounts of the particles comprising the electro-active material include but are not limited to from 25 to 65% by weight based on the total weight of the composition.

Carbonaceous Material:

The compositions may further comprise carbonaceous material other than graphite. Carbonaceous material includes but is not limited to carbon. Specific forms of carbon include carbon obtained from pyrolysis or combustion such as soot, carbon black, acetylene black. Other forms include carbon nanotubes, etc. Carbon fibers may also be used.

The carbonaceous material may be doped with lithium ions or other ions.

The carbonaceous material may be provided as a composition of solids, more particular, of dry particles, for example in the form of a free flowing powder.

The carbonaceous material may consist of particles having a particle size of less than 15,000 μm, or less than 5,000 μm. Generally, the average particle sizes (number average) are from 500 nm to about 2,000 μm. The particles may be substantially spherical which includes spherical particles and elongated particles that can be approximated as spheres having a longest axis that is up to 2 times the length of the second longest axis. The particles may be in the form of fibers, for example fibers where the longest axis has more than 5 times or more than 10 times the length of its diameter, or the particles may have other shapes.

The carbonaceous material may be blended with the particles comprising the electro-active material described above and then suspended or dispersed with water and provided as an aqueous dispersion.

If carbonaceous material is used, it is preferred to add a small amount of wetting agent to aid dispersing the carbonaceous particles.

The carbonaceous material may be used as a filler. In case of the material being electroconductive it may also function as supporting electrode material.

Amounts of carbonaceous material include but are not limited to from 0 to 45%, for example from 0.2 to 25 or from 1.5 to 15% by weight based on the weight of the composition.

Organic Liquids

The compositions disclosed herein contain one or more organic liquids (i.e. organic liquids having a melting point below 20° C.). The liquids have a boiling point from about 70 up to 200° C., preferably from about 80° C. to about 150° C.

Preferably, the organic liquids are selected from non-functional hydrocarbons and functional hydrocarbons, which functional hydrocarbons contain one or more functional groups selected from alcohol (—OH); ether (—O—) chlorine (—Cl), nitrile (—CN), carboxy (—COOH, COOM, wherein M is a metal ion), carboxylate (—C(=O)O—R) and combinations thereof. Carboxylate groups are esters of a carboxylic acid and R represents a hydrocarbon residue that may contain no functional groups or one or more functional groups as described above.

Typically, the organic liquids contain at least 3 and up to and including 12 carbon atoms. Preferably, they are acyclic.

In a preferred embodiment, the organic liquids are acyclic and are selected from those that can form an azeotrope with water. Specific liquids include but are not limited to ethanol, n-propanol, iso-propanol, n-butanol, iso-butanol, sec-butanol, tert-butanol, allyl alcohol, ethyl acetate, propyl acetate, formic acid, acetic acid, propanoic acid, toluene, xylene, benzene, cyclohexene, carbon tetra chloride, ethylene dichloride, 2-methoxyethanol. The azeotropes can be removed easily from the coated compositions which improves their handling, in particular in an industrial scale. Preferably the organic liquids are added in ratios with water where an azeotrope forms or is formed in situ, for example during the drying process where first excess amounts of the lower boiling component are removed such that the azeotrope-forming ratios are generated during the drying process.

The organic liquids are believed to act as lubricants and aid in the formation of homogeneous films.

Organic liquids are preferred that do not dissolve or soften the fluoropolymers as such liquids may be difficult to remove from the coatings. Whether a liquid dissolves or softens the fluoropolymer can be determined, for example, by adding 100 ml of liquid to 10 g of polymer (polymer particles with particle size of less than 1,000 μm and stirring for 1 hour in the organic liquid that is held at 50° C.). By visible inspection it can then be determined whether the polymer particles have dissolved or softened. The particles have softened when they have become sticky or swollen or both. An increase in viscosity of the supernatant also indicates the polymer has dissolved into it.

Preferred organic liquids include carboxylic acid esters with or without additional hydroxyl and/or ether functions. Other preferred organic liquids include ether alcohols.

Amounts that may be used include but are not limited to 1 to 14% by weight based on total weight of composition. The amount of organic liquid by weight is generally less than the amount of water.

Wetting Agents

The composition of the present disclosure may contain a small amount of wetting agents (e.g., emulsifiers). However, wetting agents may be difficult to remove from the electrode coatings. High residual amounts of wetting agents may lead to an increase in internal resistance and deterioration of cycle characteristics of the battery.

It is an advantage of the present compositions that they may contain only very small amounts of wetting agents. In fact, the amount of wetting agent can be as low as up to and including 1.0 wt. %. In one embodiment the composition contains only up to 0.5% of wetting agents or even only up to 0.2 wt. % of wetting agents (based on the total weight of the composition). Preferably the composition contains at maximum up to 0.1 wt. % of wetting agent. In one embodiment, the amount of wetting agent is from 0.03 to 0.09% by weight.

Preferably the compositions are free or essentially free of fluorinated emulsifiers to meet governmental regulatory requirements. "Essentially free" as used herein means an amount of less than 500 ppm, preferably less than 50 ppm (based on the total weight of the composition). Fluorinated emulsifiers include fluorinated alkanoic acids wherein the alkanoic chain may be interrupted once or more than once by an oxygen atom. Typically, they correspond to the general formula

$$[R_f\text{—}O\text{-}L\text{-}Z^-]X^+ \quad (II)$$

are used. In formula (II) L represents a linear or branched or cyclic partially or fully fluorinated alkylene group or an aliphatic hydrocarbon group, $R_f$ represents a linear or branched, partially or fully fluorinated aliphatic group or a linear or branched partially or fully fluorinated group that may be interrupted once or more than once by an oxygen atom. $Z^-$ represents an acid anion (including a carboxylic acid group or a sulfonic acid groups or a sulfate group) and $X^+$ represents a cation. In case the emulsifier contains a partially fluorinated aliphatic group it is referred to as a partially fluorinated emulsifier. Preferably, the molecular weight of the anionic part of the emulsifier is less than 1,000 g/mole, most preferably the molecular weight of the emulsifier is less than 1,000 g/mole. Preferably, L is linear. Specific examples of fluorinated emulsifiers include those as described in, for example, US Pat. Publ. 2007/0015937 (Hintzer et al.). Exemplary emulsifiers include but are not limited to: $CF_3CF_2OCF_2CF_2OCF_2COOH$, $CHF_2(CF_2)_5COOH$, $CF_3(CF_2)_6COOH$, $CF_3O(CF_2)_3OCF(CF_3)COOH$, $CF_3CF_2CH_2OCF_2CH_2OCF_2COOH$, $CF_3O(CF_2)_3OCHFCF_2COOH$, $CF_3O(CF_2)_3OCF_2COOH$, $CF_3(CF_2)_3(CH_2CF_2)_2CF_2CF_2CF_2COOH$, $CF_3(CF_2)_2CH_2(CF_2)_2COOH$, $CF_3(CF_2)_2COOH$, $CF_3(CF_2)_2(OCF(CF_3)CF_2)OCF(CF_3)COOH$, $CF_3(CF_2)_2(OCF_2CF_2)_4OCF(CF_3)COOH$, $CF_3CF_2O(CF_2CF_2O)_3CF_2COOH$, and their salts.

Useful non-fluorinated wetting agents include, but are not limited to, ionic and non-ionic surfactants. Useful substances include but are not limited to alkyl sulfates, sulfonates, phosphates, phosphonates wherein the alkyl residues may optionally contain ether functionalities. Examples for non-ionic emulsifiers include but are not limited to aliphatic and aromatic polyether alcohols, alkyl polyglycosides and sorbitols such as the TRITON or TERGITOL series from Dow (polyetheralcohols) and the GLUCOPON series from Cognis (alkyl polyglycosides). Other examples include but are not limited to siloxane emulsifiers, for example ethoxylates silanes such as those available under the trade designation SILWET from Momentive. Combinations of emulsifiers may also be used. Preferably, the emulsifiers are not aromatic.

Other Ingredients

The compositions of the present disclosure do not require the presence of other ingredients, although other ingredients, including but not limited to pH adjusting agents, thixotropic agents, adhesion promoters and others may be added. The amounts of other ingredients may be from 0 to 15% by weight based on the weight of the composition. In one embodiment the amount of additional ingredients is less than 1% or is even 0% by weight.

Viscosity

The aqueous compositions may be formulated by using the ratio of liquid to solid ingredients such that the compositions have the desired viscosity. In the production of electrodes, electrode forming compositions may be spread over porous support structures. Preferably, the compositions have a high enough viscosity that allows for the compositions to be spread over such support structures. Preferably, the compositions have a viscosity of at least 1,000 mPa s (as determined by rheometry at 20° C., shear rate of 100 s$^{-1}$, plate-plate rheometer). Preferably, the viscosity of the compositions under these conditions is less than 1,000,000 mPa s$^{-1}$ as such pastes may be too viscous and no longer conveniently spreadable. Preferably, the compositions have a viscosity of between 100 and 2,000 m Pa s$^{-1}$ at a shear rate between 800 and 1,000/s.

Production of the Compositions and of Electrodes

In a preferred embodiment the composition according to the present disclosure is prepared by preparing an aqueous solution or mixture that contains a wetting agent if necessary. The wetting agent may be necessary if the composition contains graphite or carbonaceous material other than graphite. The organic liquid may be added to aqueous composition but it may also be added to the fluoropolymer composition or separately to the final composition or anytime during the preparation of the composition. The aqueous solution or mixture may make up most of the aqueous phase of the final composition. To this solution or mixture the material suitable for preparing electrodes as described above and the carbonaceous material as described above are added, preferably in small portions, under stirring. The fluoropolymer particles are then added under stirring, preferably as an aqueous dispersion and more preferably dropwise or in small portions. Preferably, the fluoropolymer dispersion is prepared by aqueous emulsion polymerization but without using fluorinated emulsifiers. Such dispersions can be prepared with non-fluorinated emulsifiers. The emulsifiers can be nonionic or anionic emulsifiers. The resulting fluoropolymer dispersions may have residues of such emulsifiers. If necessary a predetermined amount of wetting agent may be added to the dispersion, however, this may not be necessary and preferably is avoided.

To produce electrodes, the aqueous composition is applied onto at least one surface, and preferably both face surfaces, of a carrier for electrodes by means known in the art, such as by brush, roller, squeegee or vacuum coating. The carrier may be an electro-conductive substrate. It is generally thin. Usually it comprises an electro-conductive material and is in the form of a foil, mesh or net of a metal, such as aluminum, copper, lithium, iron, stainless steel, nickel, titanium, or silver. The coated carrier substrate is then dried to form a coherent composite electrode layer. The material may be subjected to one or more calendering steps and additional processing steps. The electrodes may be used, for example, in batteries, for instance in non-aqueous-type batteries, such as lithium batteries.

The aqueous electrode composition of the present disclosure has an advantage in processing, in that it can be dried fast and at rather low temperatures, and in some embodiments at temperatures close to the melting temperature of the fluoropolymers, for example in embodiments with fluoropolymer with melting points around 105 to 161° C. As a further advantage of the present compositions the organic liquids can be easily removed from the coatings by heat-treatment. The compositions can be handled safely due to the rather high boiling points of the organic liquids used, and in preferred embodiments additionally also due to their miscibility or solubility with water. Solvents and softeners with high boiling points tend to remain to some extend in the electrode film and may negatively impact on the performance of the electrode. Solvents or softeners with low boiling points tend to have high vapor pressures and high volatility and may thus require additional safety requirements for their handling to avoid exposure to workers. Also emulsifiers are difficult to remove from electrode coatings but the present compositions only contain an acceptable minimal amount. A further advantage of using organic liquids capable of forming azeotropes with water is that they can be easily removed together with the water. This reduces the risk of leaving residues in the resulting coating. Even liquids with a higher boiling point than water can be removed as azeotrope at lower temperatures. This further reduces the temperatures at which the electrode coatings have to be treated and the risk of deactivating heat-sensitive electro-active materials, in particular lithium salts. More heat-sensitive electroactive materials may become available for electrode production.

The electrodes of the present disclosure can be used to form an electrochemical device, such as a battery, capacitor, electric double layer capacitor, membrane electrode assembly (MEA) or fuel cell, by means known in the art. A non-aqueous-type battery can be formed by placing a negative electrode and positive electrode on either side of a separator. The separator is generally a polymeric porous film impregnated with an electrolytic solution.

EXAMPLES

The present disclosure is further illustrated by way of examples without however intending to limit the disclosure to the examples and specific embodiments illustrated. Prior to that the test methods used to characterize materials and their properties are described.

Determination of Solid Content:

The solid content was determined gravimetrically according to ISO 12086.

Particle Size

Particle size of fluoropolymer particles in dispersions was measured via inelastic light scattering using a Malvern 1000 HAS Zetasizer. The particle size is reported as $D_{50}$. Particle sizes on solid compositions were determined laser diffraction analysis (ISO 13320) using HELOS (helium-neon optical system) [H 1959]+ RODOS from Sympatech GmbH, Germany and are also reported as $D_{50}$. The manufacturers recommendations for equipment and procedures are to be followed selecting the appropriate equipment for specific particle size ranges in particle size ranges others than those described in the examples are to be determined. Average particle sizes are expressed as $D_{50}$ value.

MFI and Melting Points

Melt flow index and melting points were determined according to ISO 12086 (version in use in 2015).

Viscosity

The viscosity was determined using a Modular Compact Rheometer MCR 102 from Anton Paar Germany GmbH, Germany Measurements were taken at a plate-plate configuration at 20° C. (lower plate was kept at 20° C.), gap size of plates was 0.4 mm.

Example 1(Comparative)

0.2 g of SILWET L77 were added to 210.6 g of distilled water. To the resulting solution 251.1 g lithium iron phosphate and 2 g carbon black were added batchwise under stirring using a homogeniser (KA T25 digital-Ultra-Turrax) at 4,000 to 9,000 rpm followed by a dropwise addition of 99.0 g of an aqueous fluoropolymer dispersion (THV copolymer, prepared without addition of fluorinated emulsifiers according to WO 2207/120348, solid content 29.5; <0.1% wt of GENAPOL LRO; MFI 13.5 g/10 min (265° C./5 kg); melting point 113° C., average particle size of 73 nm). The resulting paste had a viscosity of $2-3\times10^5$ m Pa s at a shear rate of 100/s and of $3-8\times10^3$ m Pa s at a shear rate of 1000/s. The nominal solid content was 51% by weight. The paste was spreadable but after spreading over a metal fabric with 500 μm openings it was of inhomogeneous and crumbly appearance.

Example 2

Example 1 was repeated except that 0.2 g of SILWET L77 were added to a mixture of 179.0 g of distilled water and 31.6 g of 2-methoxyethanol. The mixture was homogenised by mild stirring. To the mixture were added batchwise and under stirring 251.1 g of lithium iron phosphate and 11.7 g of carbon black using the homogeniser of example 1 at a speed of up to 10,000 rpm for 8 minutes. Then 99.0 g of the fluoropolymer dispersion of example 1 was added dropwise under stirring using the homogeniser of example 1. When the addition was complete, the mixture was subjected to stirring at 3200 rpm until the paste was homogeneous. The resulting paste had a viscosity of $1-2\times10^5$ m Pa s at a shear rate of 100/s and of $2-6\times10^2$ m Pa s at a shear rate of 1000/s. Nominal solid content was 51% by weight. The paste was spread over the metal fabric used in example 1 web and remained homogeneous.

The invention claimed is:

1. A fluoropolymer composition comprising
   (i) fluoropolymer particles comprising (a) repeating units derived from at least one perfluorinated comonomer selected from tetrafluoroethylene, hexafluoropropylene and a combination thereof; and (b) one or more non-perfluorinated comonomers selected from vinylidenefluoride, ethylene, propylene and a combination thereof;
   wherein the total amount of the perfluorinated comonomers is at least 40% by mole based on the total amount in moles of comonomers and wherein the fluoropolymer is melt processable;
   (ii) from about 30% to about 70% by weight, based on the total weight of the composition, of particles comprising electro-active material, wherein the electro-active material is selected from graphite, a metal compound, and combinations thereof;
   (iii) water;
   (iv) an organic liquid having a boiling point between 70° C. and 200° C. selected from non-functional hydrocarbons and functional hydrocarbons, which functional hydrocarbons contain one or more functionality selected from nitriles, chlorines, and oxygen-containing functionalities selected from ethers, alcohols, carboxylates, carboxylate esters and combinations thereof,
   wherein the amount by weight of the particles comprising electroactive materials (ii) is greater than the amount of fluoropolymer particles (i) and wherein the amount by weight of water is greater than the amount of organic liquid.

2. The composition according to claim 1 wherein the organic liquid has from 3 to 12 carbon atoms.

3. The composition according to claim 1, wherein the organic liquid has a boiling point of from at least 80° C. and up to 150° C.

4. The composition according to claim 1, wherein the organic liquid is an acyclic compound and can form an azeotrope with water.

5. The composition according to claim 1, wherein the fluoropolymer has a melting point between 90° C. and 280° C.

6. The composition according to claim 1, wherein the fluoropolymer particles comprise copolymers comprising units selected from (a) tetrafluoroethylene, hexafluoropropylene, and vinylidene fluoride; (b) tetrafluoroethylene, hexafluoropropylene and ethylene; (c) tetrafluoroethylene and ethylene; and (d) tetrafluoroethylene and propylene.

7. The composition according to claim 1, containing less than 1.0% by weight of emulsifiers, based on the total weight of the composition.

8. The composition according to claim 1, further comprising carbonaceous particles other than graphite, wherein the carbonaceous particles other than graphite are selected from carbon particles, carbon nanotubes, carbon fibers and combinations thereof.

9. The composition according to claim 1, comprising from 5 to 50% by weight of water, based on the total weight of the composition.

10. The composition according to claim 1, wherein the electro-active material comprises metal compounds selected from lithium salts, lithium oxides, lithium-metal oxides, lithium-metal salts and combinations thereof.

11. The composition according to claim 1, wherein the composition is a paste and has a viscosity of at least 1,000 mPa s as determined by rheometry at 20° C. and a shear rate of 50 s$^{-1}$.

12. A method of making a fluoropolymer composition according to claim 1, comprising
   preparing an aqueous mixture comprising water and
   a) from about 30% to about 70% by weight, based on the total weight of the composition, of particles comprising electro-active material selected from graphite, metal compounds and combinations thereof, and, optionally, carbonaceous particles other than graphite;
   b) fluoropolymer particles; and
   c) an organic liquid;
   wherein the amount by weight of the particle comprising the electro-active material is greater than the amount of fluoropolymer particles,
   and wherein the amount by weight of water is greater than the amount of organic liquid,
   and wherein the fluoropolymer particles comprise repeating units derived from (i) at least one perfluorinated comonomer selected from tetrafluoroethylene, hexafluoropropylene and a combination thereof and (ii) one or more non-perfluorinated comonomers selected from vinylidenefluoride, ethylene, propylene and a combination thereof;
further wherein the total amount of the perfluorinated comonomers is at least 40% by mole based on the total amount in moles of comonomers and wherein the fluoropolymer is melt processable,
and wherein the organic liquid has a boiling point between 70° C. and 200° C. and is selected from non-functional hydrocarbons and functional hydrocarbons, which functional hydrocarbons contain one or more functionality selected from nitriles, chlorines, and oxygen-containing functionalities selected from ethers, alcohols, carboxylates, carboxylate esters and combinations thereof.

13. A method of making an electrode comprising coating a carrier material for an electrode with a composition according to claim 1, and subjecting the composition to drying.

14. An electrode comprising a coating obtained from a composition according to claim 1.

* * * * *